United States Patent [19]

Chung et al.

[11] Patent Number: 5,147,995
[45] Date of Patent: Sep. 15, 1992

[54] DISCHARGING CIRCUIT ARRANGEMENT FOR AN ELECTRICAL DISCHARGING MACHINE

[75] Inventors: Ya-Chien Chung; Huann-Jen Yang, both of Hsin chu shien, Taiwan

[73] Assignee: Industrial Technology Research Institute, Hsin Chu, Taiwan

[21] Appl. No.: 693,559

[22] Filed: Apr. 30, 1991

[51] Int. Cl.$^5$ .............................................. B23H 1/02
[52] U.S. Cl. .............................. 219/69.13; 219/69.18; 363/124
[58] Field of Search ................ 219/69.13, 69.18; 323/282; 363/39, 124

[56] References Cited

U.S. PATENT DOCUMENTS

| | | | |
|---|---|---|---|
| 3,974,357 | 8/1976 | Saito et al. | 219/69.13 |
| 4,681,997 | 7/1987 | Inoue et al. | 219/69.13 |
| 4,940,872 | 7/1990 | Futamura | 219/69.13 |

FOREIGN PATENT DOCUMENTS 2-30430  1/1990  Japan ................................ 219/69.13

Primary Examiner—Geoffrey S. Evans
Attorney, Agent, or Firm—Dvorak and Traub

[57] ABSTRACT

A discharging circuit, whereby a triangular discharging current waveform is generated; the ascending section of the triangular discharging current waveform is to be determined by a voltage and an inductance of the circuit, while the variation rate of a descending section of the waveform is to be controlled by an inductance, a peak current and a resistance in the circuit so as to generate a negative and descending current variation rate.

3 Claims, 4 Drawing Sheets

DISCHARGING CIRCUIT ARRANGEMENT FOR AN ELECTRICAL DISCHARGING MACHINE

BACKGROUND OF THE INVENTION

During using a wire-cutting electric discharging machine, since the wave width of current waveform in an electric discharging machine is too long (>10 μs), it would cause the breakage of the wire and a coppersticking phenonmenon; therefore, the wave width of current waveform in an electric discharging machine for wire cutting is usually limited within 10 μs. In order to elevate the cutting speed, a considerable higher energy has to be applied in the discharging gap within the aforesaid period of time, i.e., to increase the value of peak current. During discharging, the wire electrode is under high tensile condition, and therefore the wire electrode is often broken as a result of consumption. A triangular discharging waveform can prevent the wire electrode and working piece from fast consumption ratio; in other words, it can increase the cutting speed.

SUMMARY

This invention relates to a discharging circuit for an electric discharging machine. Although a capacitor type of discharging circuit can control the width of waveform by means of a proper capacitance value and an inductance circuit, the discharging circuit is unable to generate a trianguar discharging waveform, which can be generated only with a transistorized discharging circuit. According to the present invention, a discharging machine including a discharging circuit and a discharge-controlling circuit can generate a triangular discharging current waveform; the ascending section of the triangular discharging waveform is to be determined by means of a voltage and an inductance of the discharging circuit, while the variation rate of the descending section of the triangular discharging waveform is to be determined by means of an inductance, a peak current and a resistance in the discharge-controlling circuit; the current in the descending section is controlled with a sharpe negative slope.

DETAILED DESCRIPTION

Figure 1:
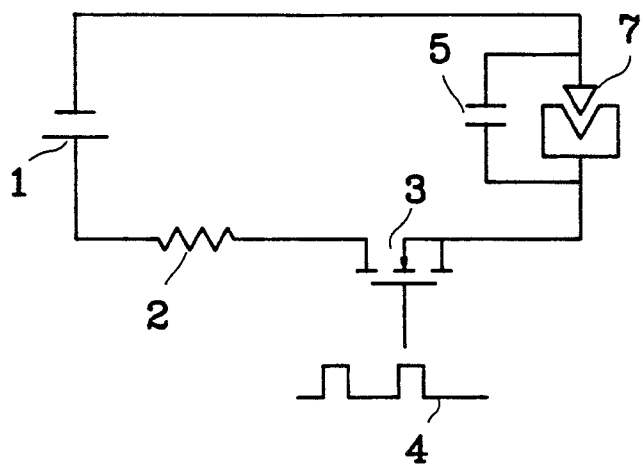
FIG. 1 is a conventional capacitor type of discharging circuit.
Figure 2:
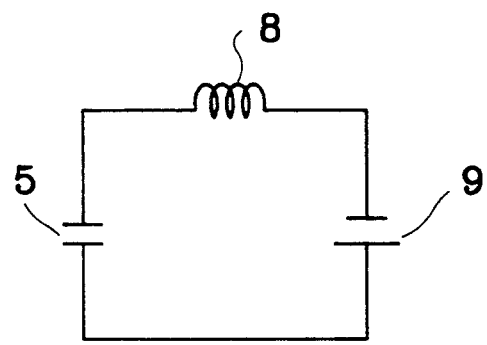
FIG. 2 is an equivalent discharging circuit diagram.
Figure 9:
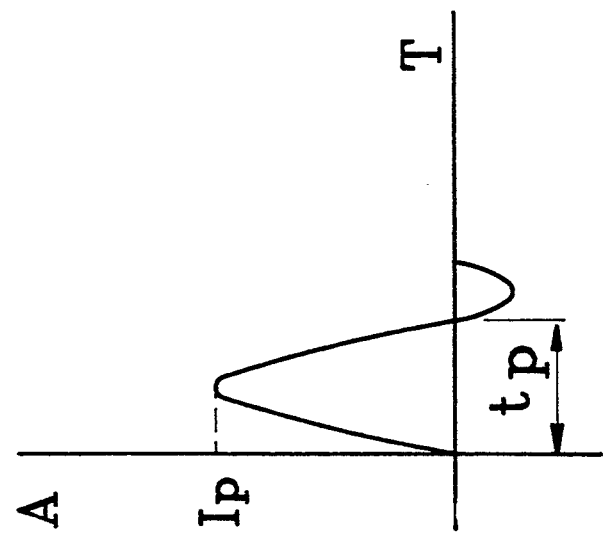
FIG. 9 illustrates a waveform in a capacitor type of discharging circuit.

Referring to FIG. 1, a capacitor type of discharging circuit diagram comprises a direct current (D.C.) POWER SUPPLY 1, a resistor 2, a chopping device switch 3, a control-and-driving signal 4, a capacitor 5, a workpie 6 and a wire electrode 7. During discharging, the power is mainly supplied with the capacitor 5. Referring to FIG. 2 (an equivalent discharging circuit diagram), the circuit diagram comprises a capacitor 5 which has a voltage of "Vc", an inductance L 8 which is unavoidable by wiring, and a gap voltage Vg 9. The current wave is an index form as shown in FIG. 9, and the width of current waveform can be obtained with the following equation:

$$tp = \lambda \sqrt{LC}$$

The peak value of current:

$$Ip = (Vc - Vg)/\sqrt{\frac{L}{C}}$$

Figure 3:
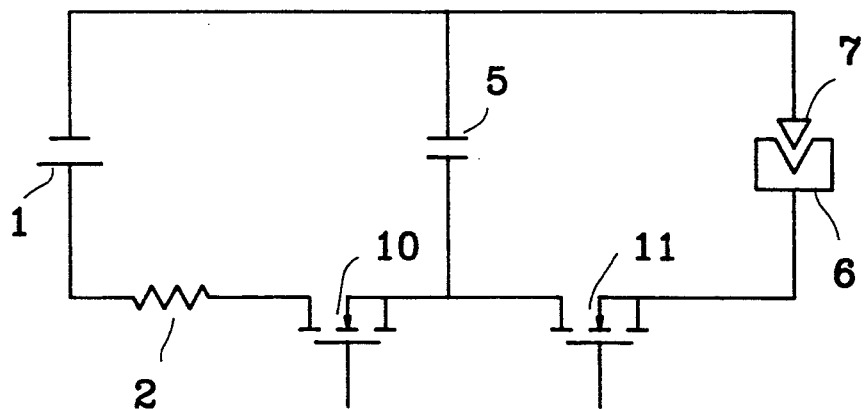
FIG. 3 is a conventional storage capacitor type of discharging circuit diagram.

The peak value of current are closely related to and the voltage across the capacitor during discharging; A peak value of a discharging current may be obtained with a storage capacitor type of discharging circuit as shown in FIG. 3, which comprises a charging circuit switch 10 and a discharging circuit switch 11.

Figure 4:
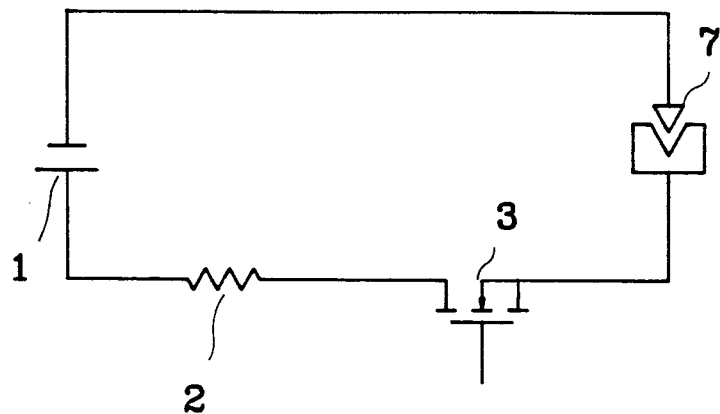
FIG. 4 is a transistor type of discharging circuit diagram.

During charging, the charging circuit switch 10 is turned on, while the discharging circuit switch 11 is turned off. When the capacitor 5 is charged to a desired voltage level the charging circuit switch 10 will be turned off, while the discharging circuit switch 11 will be turned on to be ready for discharging; the aforesaid circuit can obtain a consistent result between the width of current waveform and the waveform crest; the major advantage thereof is that a large current switching may not take place during the high current moment, but the drawback is that a triangular discharging waveform is unable to generated, The aforesaid drawback can be improved by using a transistorized discharging circuit as shown in FIG. 4.

In the transistorized discharging circuit, if the value of the limiting resistor 2 is relatively small or zero, the ascending rate of current, upon the carrier-wave switch 3 being turned on, would be $$Sr=(Vs-Vg)/L$$

in which Vs is the level of the D.C. power supply 1, and Vg is the gap voltage during discharging.

Figure 5:
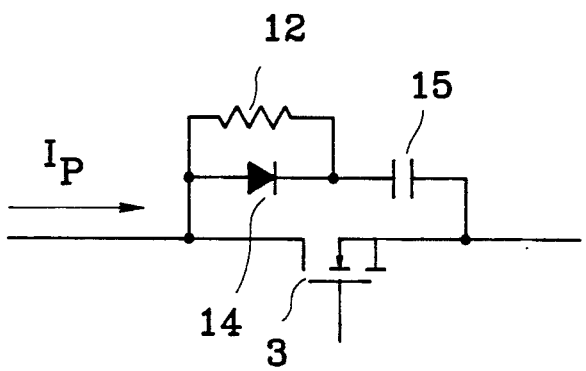
FIG. 5 is a snubber circuit diagram which is added in the switch device as shown in FIG. 4.
Figure 6:
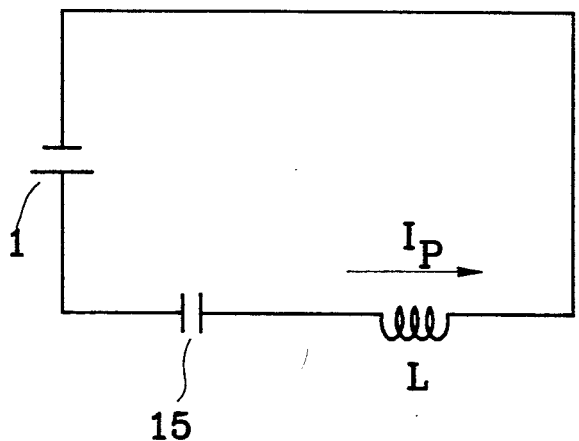
FIG. 6 is an equivalent current circuit diagram upon the diode 14 becoming conductive as shown in FIG. 4.

When the current is ascended to a desired value, the switch 3 has to be turned off; however, a directly turning off would damage the switch 3. If a snubber circuit such as a RCD circuit as shown in FIG. 5 is added in the aforesaid circuit, the aforesaid damage would be avoided. FIG. 5 includes a resistor 12, a diode 14, and a capacitor 15; after the switch 3 is turned off, a current would first flow through the capacitor 15 on the output end of the switch 3, and the diode 14. An equivalent circuit of FIG. 5 is shown in FIG. 6, which is substantially a LC circuit to receive a given current upon the Ip being increased; however, such a circuit is unable to generate a triangular discharging waveform in the descending section of the waveform.

According to the present invention, a discharging circuit is so designed that when the switch element is turned off, a negative current variation is to be generated by means of an equivalent circuit having a current to flow.

Figure 7:
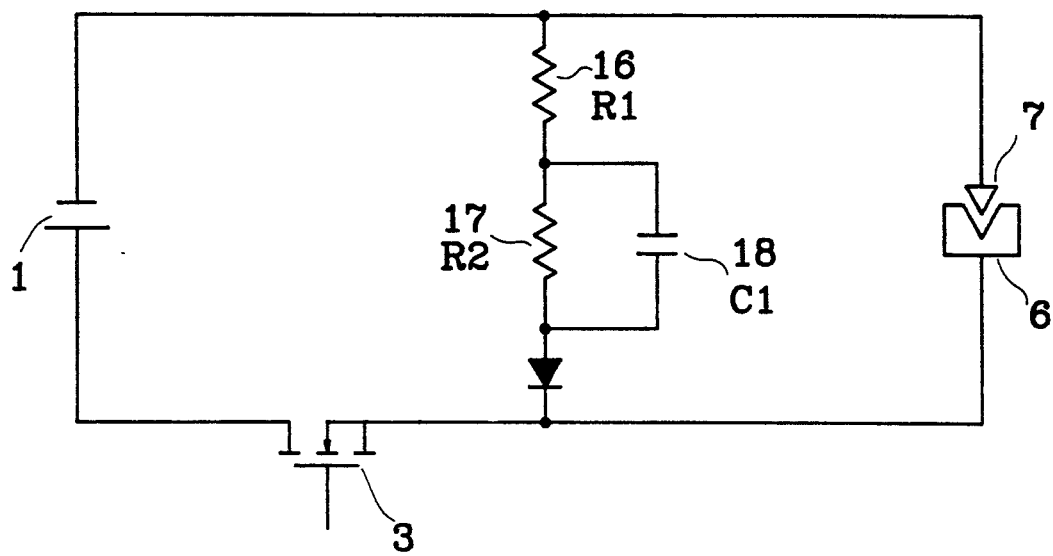
FIG. 7 is an embodiment of the discharging circuit diagram according to the present invention.
Figure 8:
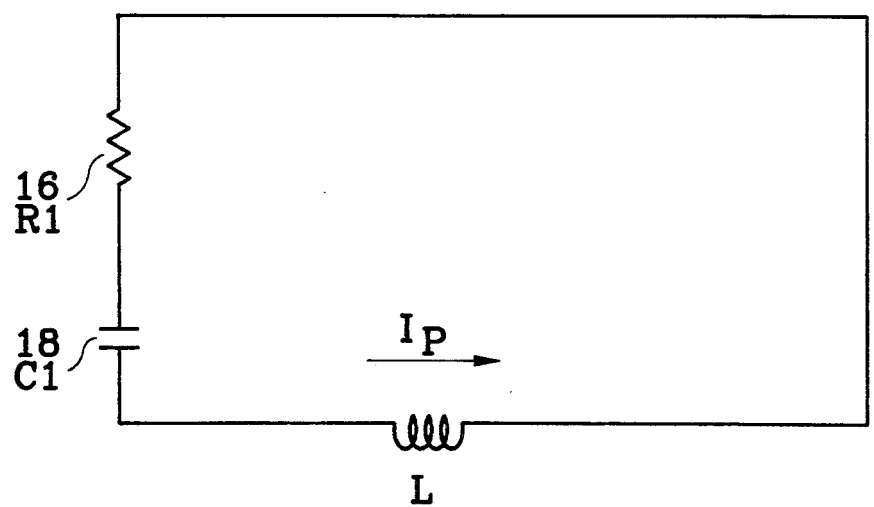
FIG. 8 is an equivalent circuit diagram as shown in FIG. 7 upon the switch element being turned off.

FIG. 7 is an embodiment of a discharging circuit diagram according to the present invention, which comprises a resistor R1 16, a resistor R2 17, a capacitor C1 18, and a diode 19. When the current is increasing, the aforesaid circuit has an ascending rate of current, i.e., $$Sr=(Vs-Vg)/L$$

in which Vs stands for the level of the D.C. power supply 1, Vg stands for the gap voltage, "L" stands for the inductance in the circuit. As soon as the current reaches the peak value Ip, the switch 3 will be turned off, while the diode 19 is turned on; an equivalent circuit thereof is shown in FIG. 8; the variation curve of the current is shown as follows:

$$R1.Ip+Sf.L=0$$

and then $$Sf=-R1\cdot Ip/L;$$

likewise, the resistance of R1 16 can be obtained with the known reducing rate of current, Ip and L, i.e., $$R1=|Sf|.L/Ip.$$

Figure 10:
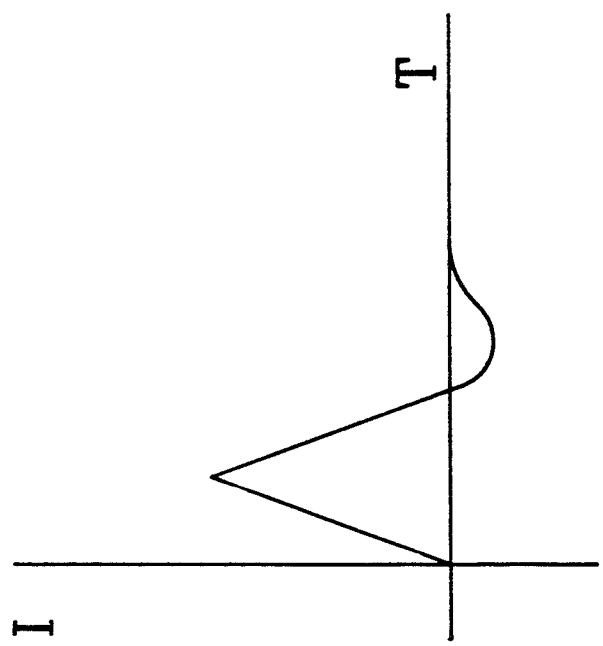
FIG. 10 illustrates a triangular current waveform with underdamping condition.

In order to obtain an approximate triangular discharging waveform, the value of the capacitor C1 18 must be designed properly. The aforesaid equivalent circuit is a RLC circuit with an underdamping function so as to obtain a better result as shown in FIG. 10. The critical damping conditions of the RLC circuit may be satisfied with the following:

$$R^2|C|-4L=0;$$

under the condition of underdamping, $$C| < (4L/R^2|)$$

according to the above equation, the value of C1 18 can be selected.

In FIG. 7, the value of resistor R2 17 is designed in accordance with the value of C1 so as to let C1 18 store energy during a charging period, and discharge completely during the rest time of the discharge gap. A triangular discharging waveform may be obtained by means of the aforesaid circuit with a proper selection on the values of R1, R2 and C1 so as to increase the cutting speed.

We claim:

1. An electrical circuit for controlling a discharge current waveform in an electrical discharge cutting apparatus, said circuit comprising:
    a voltage power supply;
    a switch element having a first end connected to a positive output of said voltage power supply;
    a wire electrode having an end connected to a negative output of said voltage power supply;
    a workpiece connected to a second end of said switch element, said workpiece disposed proximate said electrode to form a working gap therebetween;
    a diode having a cathode connected to said second end of said switch element;
    a first resistor having a first end connected to said negative output of said voltage power supply;
    a second resistor having a first end connected to a second end of said first resistor and a second end connected to an anode of said diode;
    a capacitor connected in parallel with said second resistor;
    whereby said circuit forms a triangular discharge current waveform having,
    an ascending component when said switching element is closed ascending to a peak current value at a rate given by (Vp−Vg) /L where Vp is a voltage of said voltage power supply, Vg is a voltage of said gap, and L is an inductance of said circuit when said switch element is closed,
    a descending component when said switching element is open descending at a rate given by (R1 * Ip) /L where R1 is a resistance value of said first resistor, Ip is a peak current value, and L is said inductance,
    whereby said triangular waveform increases a cutting rate of said apparatus.

2. The electrical circuit of claim 1 wherein said first resistor has a resistance value given by (Sf * L) /Ip where Sf is said descending rate, L is said inductance, and Ip is said peak current;
    said capacitor has a capacitance value given by (4 * L) /R1² where L is said inductance and R1 is said resistance value; and
    whereby said second resistor has a sufficient resistance to permit energy stored in said capacitor to fully discharge within a resting time of said working gap.

3. The electrical circuit of claim 1 wherein said switch element is a transistor.

* * * * *